United States Patent [19]

Burayez

[11] Patent Number: 5,398,016
[45] Date of Patent: Mar. 14, 1995

[54] VEHICLE DEFENSE SYSTEM

[76] Inventor: Taher Burayez, 17351 Angelaine, Granada Hills, Calif. 91344

[21] Appl. No.: 183,942

[22] Filed: Jan. 21, 1994

Related U.S. Application Data

[63] Continuation-in-part of Ser. No. 980,989, Nov. 25, 1992, abandoned.

[51] Int. Cl.⁶ ............................................. B60R 25/10
[52] U.S. Cl. ..................... 340/426; 116/214; 340/693
[58] Field of Search ............. 340/426, 425.5, 430, 340/428, 429, 471, 693, 573; 116/214; 180/287; 307/10.2; 109/20; 222/3, 4

[56] References Cited

U.S. PATENT DOCUMENTS

| | | | |
|---|---|---|---|
| 3,828,341 | 8/1974 | Carter, Jr. | 340/571 |
| 4,841,752 | 6/1989 | Fletcher | 109/20 |
| 4,958,142 | 9/1990 | Sayers | 340/426 |
| 5,182,541 | 1/1993 | Bajorek | 340/428 |

FOREIGN PATENT DOCUMENTS 2596554  3/1986  France ............................ 340/426

Primary Examiner—Hezron E. Williams
Assistant Examiner—Christine K. Oda
Attorney, Agent, or Firm—G. Donald Weber, Jr.

[57] ABSTRACT

A Vehicle Defense or Security System (VDS) which, once triggered, generates enough smoke to completely engulf the interior of a protected vehicle. The smoke attracts attention to the vehicle and visually impairs would be thieves from seeing valuables inside the vehicle. VDS can be used as an add-on to existing alarms or as a stand-alone defense system. The smoke generated is non-toxic and harmless to humans and the interior of the vehicle. This system provides a unique, effective defense or security system which is silent to eliminate annoying false alarm sirens, horns or the like.

10 Claims, 1 Drawing Sheet

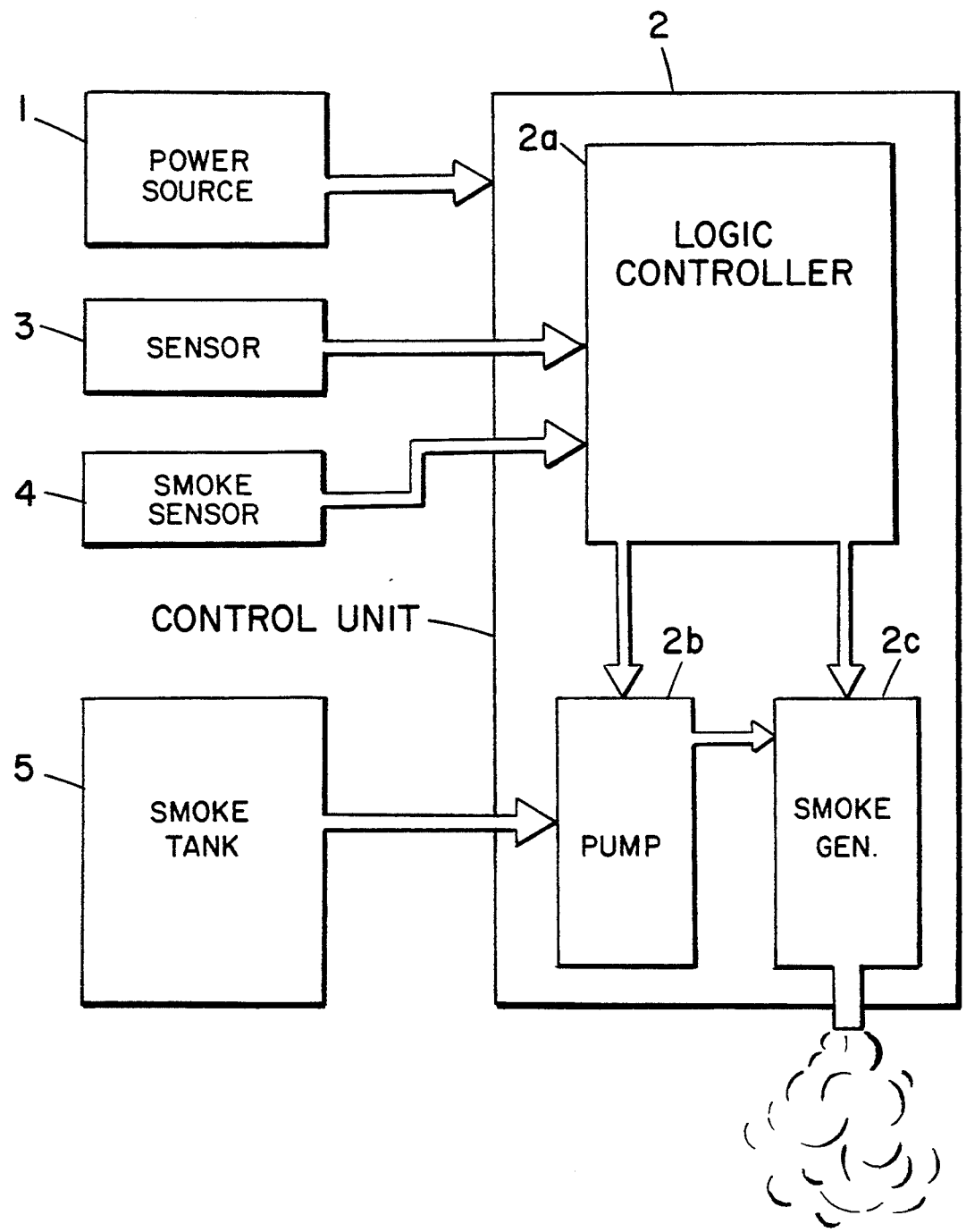

VEHICLE DEFENSE SYSTEM

This is a continuation-in-part of application Ser. No. 07/980,989, filed on Nov. 25, 1992, now abandoned.

BACKGROUND

1. Field of the Invention

This invention is directed to a system for defending or protecting an enclosed property, such as an automobile, in general, and to a Vehicle Defense System (VDS) using thick smoke (or fog) to protect the automobile and to scare away would be thieves silently, in particular.

2. Prior Art

Many types of alarms are known. These alarms include tamper alarms which indicate tampering with property. One type of property for which alarms are now very common is an automobile or similar vehicle. Audible alarms or warning devices have been known in the art for many years. One type is the conventional whistle which generally requires an external pressurized source of steam or air. Other types such as air-operated diaphragm horns found on vehicles, particularly trucks, require either a vacuum or pressure source. There is also known in the art fluid operated diaphragm horns using aerosol type pressurized fluid containers as an operating source. Many of these alarms are manually operated and require both the physical and mental attention of the operating person for actuation.

Thus, what is needed is an anti-burglar device which can be fired by a relatively small amount of mechanical force. Thus, a motion caused by an unauthorized movement of an object such as a door, window, or the like will trigger the device to protect the property for a sufficient period of time to provoke action in response to the alarm emitted. Alarm sirens are becoming less and less effective because they are heard frequently and are almost always ignored. No one pays attention to such alarms anymore. Thus, a new type of protective device is required.

SUMMARY OF THE INSTANT INVENTION

This invention is a Vehicle Defense System (VDS) which, once triggered, generates enough smoke to completely engulf the interior of the protected property, e.g. a vehicle. This smoke attracts attention to the vehicle and visually impairs would be thieves from seeing valuables inside the vehicle. VDS can be used as an add-on to existing alarms or as a stand-alone defense system. The smoke generated is harmless to humans and the interior of the vehicle.

VDS is a unique, effective defense or security system which protects silently. When used alone, it eliminates annoying false alarms.

BRIEF DESCRIPTION OF THE DRAWING

The sole FIGURE is a block diagram of the property security system of the instant invention.

DESCRIPTION OF A PREFERRED EMBODIMENT

Referring now to the sole FIGURE, there is shown a power source 1, which can be a car battery, for example. This power source is used to provide necessary power, for example 12 volts, required to operate the system of the instant invention.

The power source 1 is connected to the control unit 2 which consists of three major components which include a logic controller 2a, a liquid pump 2b and a smoke generator 2c. In particular, the logic controller 2a controls the liquid pump 2b and the smoke generator 2c. The pump 2b draws liquid smoke from a holding or smoke tank 5.

Liquid smoke (a product which is readily available in the market) is a liquid material which is converted into harmless white smoke when heated in the smoke generator 2c. The smoke 6 is exhausted from the smoke generator 2c and the main control unit 2, as shown in the FIGURE. Inasmuch as the control unit 2 is mounted within the vehicle (or other enclosed property), the smoke tends to fill the area or volume of the enclosed property to the extent and density which is desired. As noted, the density of the smoke is intended to alert passersby or to render it difficult for anyone to operate the vehicle or function in the enclosed property.

The outside sensors are located outside the vehicle and are responsible for sending the control signal to the logic controller 2a to activate the VDS of the instant invention. These outside sensors can be of any conventional design or operational capability and are well known in the market.

The smoke sensors 4 determine if enough smoke has been generated and signal to the logic controller 2a to stop generating more smoke, for example, by deactivating the liquid pump 2b in order to discontinue drawing liquid smoke from the holding tank 2c and/or to disconnect the power source from a heating element enclosed in the smoke generator to thereby terminate the conversion of liquid smoke to gaseous smoke.

The liquid smoke tank 5 is a holding or storage tank which holds the liquid smoke material used to generate gaseous smoke by smoke generator 2c.

Thus, as noted above, the device operates to incorporate several major components which are powered by a 12 volt car battery. In operation, the outside sensors 3 sense or detect any violation or insult to the integrity of the vehicle and produce or send a signal to the logic controller 2a. The signal to the logic controller 2a is used to determine whether or not to trigger the VDS. Outside sensors 3 can include shock sensors, motion sensors, and/or radar sensors. These are all conventional sensors which are used in conjunction with other existing vehicle alarm systems.

When the logic controller 2a receives a signal from the outside sensors 3 and determines that a valid activating signal has been generated, the logic controller 2a sends a signal to the liquid pump 2b and to the smoke generator 2c to begin pumping the liquid smoke to the smoke generator 2c, respectively. That is, the pump 2b is rendered operative only when a signal from logic controller 2a is received. The pump 2b draws liquid smoke from the holding tank or smoke tank 5 and pumps the liquid smoke into smoke generator 2c. As noted infra, the pump 2b is turned off when a stop signal from logic controller 2a is received.

The smoke generator 2c receives the liquid smoke from the storage tank 5 via pump 2b. When smoke generator 2c receives a control signal from logic controller 2a, the smoke generator 2c is rendered operative to heat the liquid smoke until it is converted to gaseous smoke. At that point, the smoke generator 2c begins spewing gaseous smoke from the main control unit to the interior of the vehicle, as shown by the smoke fumes 6 in the FIGURE. The smoke generated by VDS is an odorless, harmless smoke which will not cause irritation to the skin or eyes and will not harm the interior of any vehicle.

The system continues to operate to produce smoke while the smoke sensors 4, mounted inside the vehicle but outside the control unit 2, sense and detect the amount of smoke generated. When the smoke has reached a predefined level, i.e. density, consistency or the like, the smoke sensors 4 supply a signal to the logic controller 2a to terminate the operation of the liquid pump and smoke generator. Thus, VDS is unique in that it is also a defense system. That is, once triggered, it is difficult to impossible to see valuables inside the vehicle. Moreover, the smoke will attract enough attention to deter would-be thieves. The system is then deactivated until reactivated in accordance with the procedures noted above.

Thus, there is shown and described an automobile defense system that can be added to existing car alarms or can be used as a stand-alone defense system. Once a violation to the vehicle is sensed by the outside vehicle sensors, the VDS releases enough smoke to substantially completely fill the interior of the car. The smoke which is released is harmless, odorless and non-toxic whereby it causes no harm to humans or the interior of the protected car.

While this description is directed to a particular embodiment, i.e. automobiles, it is understood that those skilled in the art may conceive modifications and/or variations to the specific embodiments shown and described herein. For example, the same technology could be used to protect homes, commercial buildings, banks or the like. Moreover, by using AC power and/or larger smoke generators, more smoke can be generated to protect the above-mentioned properties. Any such modifications or variations which fall within the purview of this description are intended to be included therein as well. It is understood that the description herein is intended to be illustrative only and is not intended to be limitative. Rather, the scope of the invention described herein is limited only by the claims appended hereto.

I claim:

1. A property defense system comprising,
   first sensor (3) means for detecting a first condition and producing a first signal representative of said first condition,
   said first condition is an unwanted interference with the property being defended,
   smoke generating means (2,5) selectively rendered operative to generate a non-toxic smoke (6) in response to said first signal from said first sensor means representative of said first condition, and
   second sensor means (4) for detecting a second condition and producing a second signal representative of said second condition for selectively deactivating said smoke generating means in response to a second signal from said second sensor means to thereby discontinue the operation of said smoke generating means,
   said second condition is the amount of smoke generated by said smoke generating means.

2. The system recited in claim 1 wherein,
   said smoke is an odorless smoke.

3. The system recited in claim 1 including,
   power source means for supplying power to said first and second sensor means and to said smoke generating means.

4. The system recited in claim 1 wherein,
   said power source means comprises a DC battery.

5. The system recited in claim 1 wherein,
   said smoke generating means includes a liquid smoke source, and
   means for heating the liquid smoke from said liquid smoke source to form a gaseous smoke.

6. The system recited in claim 5 including,
   pump means for transferring the liquid smoke from said liquid smoke source to said means for heating.

7. The system recited in claim 1 wherein,
   said property comprises an enclosed housing,
   said first sensor means is mounted external to said housing,
   said second sensor means is mounted internal to said housing.

8. The system recited in claim 2 wherein,
   said second sensor means includes a smoke detection means.

9. The system recited in claim 7 wherein,
   said enclosed housing comprises a vehicle.

10. A vehicle security system comprising,
    control means (2),
    battery means (1) connected to supply power to said control means,
    said control means includes logic controller means (2a),
    liquid pump means (2b) connected to said logic controller means and selectively activated thereby,
    smoke generator means (2c) connected to said logic controller means and selectively activated thereby to produce harmless smoke,
    said smoke generator means mounted within the vehicle,
    tank means (5) for holding liquid smoke,
    said liquid pump means selectively operable to pump the liquid smoke from said tank means to supply smoke generator means,
    first sensor means (3) connected to supply a first signal to said logic controller means to selectively initiate action thereby, and
    second sensor means (4) comprising a smoke detector,
    said second sensor means connected to supply a second signal to said logic controller means to terminate action thereby in response to the detection of a prescribed amount of smoke by said second sensor means.

* * * * *